(12) United States Patent
Nakamura et al.

(10) Patent No.: US 10,263,486 B2
(45) Date of Patent: Apr. 16, 2019

(54) ROTARY ELECTRIC MACHINE STATOR

(71) Applicant: Mitsubishi Electric Corporation, Tokyo (JP)

(72) Inventors: Masashi Nakamura, Tokyo (JP); Akihiro Yamamura, Tokyo (JP); Shinkichi Sawa, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 110 days.

(21) Appl. No.: 15/502,235

(22) PCT Filed: Sep. 22, 2014

(86) PCT No.: PCT/JP2014/075109
§ 371 (c)(1),
(2) Date: Feb. 7, 2017

(87) PCT Pub. No.: WO2016/046889
PCT Pub. Date: Mar. 31, 2016

(65) Prior Publication Data
US 2017/0237310 A1 Aug. 17, 2017

(51) Int. Cl.
| | |
|---|---|
| *H02K 3/50* | (2006.01) |
| *H02K 3/02* | (2006.01) |
| *H02K 3/28* | (2006.01) |
| *H02K 15/06* | (2006.01) |
| *H02K 15/00* | (2006.01) |

(52) U.S. Cl.
CPC ............ *H02K 3/50* (2013.01); *H02K 3/02* (2013.01); *H02K 3/28* (2013.01); *H02K 15/0081* (2013.01); *H02K 15/064* (2013.01); *H02K 2203/09* (2013.01)

(58) Field of Classification Search
CPC .................................. H02K 3/28; H02K 3/50
USPC .......................................................... 310/195
See application file for complete search history.

(56) References Cited

U.S. PATENT DOCUMENTS

| | | | |
|---|---|---|---|
| 10,050,483 B2* | 8/2018 | Sambuichi | ............. H02K 3/522 |
| 2011/0241461 A1 | 10/2011 | Utaka | |
| 2012/0200191 A1 | 8/2012 | Baba et al. | |

(Continued)

FOREIGN PATENT DOCUMENTS

| | | |
|---|---|---|
| JP | 2006-211779 A | 8/2006 |
| JP | 2011-036093 A | 2/2011 |
| JP | 2011-109895 A | 6/2011 |

(Continued)

*Primary Examiner* — Terrance L Kenerly
(74) *Attorney, Agent, or Firm* — Sughrue Mion, PLLC; Richard C. Turner

(57) ABSTRACT

A plurality of coil groups are each configured by connecting a tip portion of a first conductor terminal and a tip portion of a second conductor terminal that is subject to connection therewith using a connecting conductor, and the connecting conductors include: a pair of connecting portions that are respectively disposed so as to contact the tip portion of the first conductor terminal and the tip portion of the second conductor terminal that is subject to connection therewith in a circumferential direction of the tip portions so as to be parallel to the tip portions, and that are joined together with the tip portions; and a linking portion that links the pair of connecting portions.

8 Claims, 13 Drawing Sheets

(56) References Cited

U.S. PATENT DOCUMENTS

2013/0200743 A1* 8/2013 Okimitsu ................ H02K 3/12
   310/201
2018/0323670 A1* 11/2018 Sambuichi ............ H02K 3/522

FOREIGN PATENT DOCUMENTS

| JP | 2011-229367 A | 11/2011 |
| JP | 2012-125043 A | 6/2012 |
| JP | 2012-182972 A | 9/2012 |

* cited by examiner

ROTARY ELECTRIC MACHINE STATOR

CROSS REFERENCE TO RELATED APPLICATIONS

This application is a National Stage of International Application No. PCT/JP2014/075109 filed Sep. 22, 2014, the contents of all of which are incorporated herein by reference in their entirety.

TECHNICAL FIELD

The present invention relates to a stator for a rotary electric machine such as an electric motor or a generator, for example, and particularly relates to a connecting construction for a stator winding.

BACKGROUND ART

In conventional rotary electric machines, phase windings that constitute a stator winding are configured by connecting a plurality of conducting wires using connecting conductors that are each formed into a U shape that has connecting portions on two ends so as to stack and join first connecting portions of the connecting conductors by welding to tip portions of inner circumferential end portions of first conductor wires that extend outward from slot-housed portions that are disposed on innermost circumferential sides inside slots, and so as to stack and join second connecting portions of the connecting conductors by welding to tip portions of outer circumferential end portions of second conductor wires that extend outward from slot-housed portions that are disposed on outermost circumferential sides inside other slots (see Patent Literature 1, for example).

CITATION LIST

Patent Literature

Patent Literature 1: Japanese Patent Laid-Open No. 2011-036093 (Gazette)

SUMMARY OF THE INVENTION

Problem to be Solved by the Invention

However, in the conventional rotary electric machine that is described in Patent Literature 1, because the joint portions are configured such that tip portions of the conductor wires that extend axially and connecting portions of the connecting conductors are stacked in a radial direction, a clamping tool must be inserted from obliquely above to clamp the joint portions from two radial sides during welding. Thus, because welding work space is limited, one problem has been that welding work becomes complicated, reducing productivity. In addition, because it is necessary to clamp the connecting portions of the connecting conductors using the clamping tool so as to avoid a vicinity of the tips thereof in order to ensure welding work space, another problem has been that the length of the connecting portions of the connecting conductors is increased, increasing the height of the coil ends.

The present invention aims to solve the above problems and an object of the present invention is to provide a rotary electric machine stator that can improve productivity by facilitating joining work, and that also enables reductions in size by reducing coil end height.

Means for Solving the Problem

A rotary electric machine stator according to the present invention includes: an annular stator core on which slots are arranged circumferentially; and a stator winding that includes a plurality of coil bodies that are each produced by shaping a jointless, continuous conductor wire on which an insulating coating is coated. The plurality of coil bodies are each mounted to the stator core such that a first conductor terminal and a second conductor terminal of the conductor wire extend outward at a first axial end of the stator core from different radial positions inside different slots among the slots, the first conductor terminal and the second conductor terminal each include a tip portion that extends in an axial direction of the stator core, and from which the insulating coating is removed, a plurality of coil groups are each configured by connecting the tip portion of the first conductor terminal and the tip portion of the second conductor terminal that is subject to connection therewith using a connecting conductor, and the connecting conductors include: a pair of connecting portions that are respectively disposed so as to contact the tip portion of the first conductor terminal and the tip portion of the second conductor terminal that is subject to connection therewith in a circumferential direction of the tip portions so as to be parallel to the tip portions, and that are joined together with the tip portions; and a linking portion that links the pair of connecting portions.

Effects of the Invention

According to the present invention, because the joint portions are configured by stacking the tip portions of the first and second conductor terminals and the connecting portions of the connecting conductors circumferentially, a clamping tool is inserted from a radially outer side or inner side to clamp the joint portions from two circumferential sides during joining. Thus, because all of an axially outer side of the joint portions becomes a joining work space, joining work is facilitated, increasing productivity. In addition, it is not necessary to avoid the vicinities of the tips of the connecting portions of the connecting conductors in order to ensure joining work space when clamping using the clamping tool, enabling lengths of the connecting portions of the connecting conductors to be made shorter, thereby enabling coil end height to be lowered.

DESCRIPTION OF EMBODIMENTS

Preferred embodiments of a rotary electric machine stator according to the present invention will now be explained with reference to the drawings.

Embodiment 1

Figure 1:
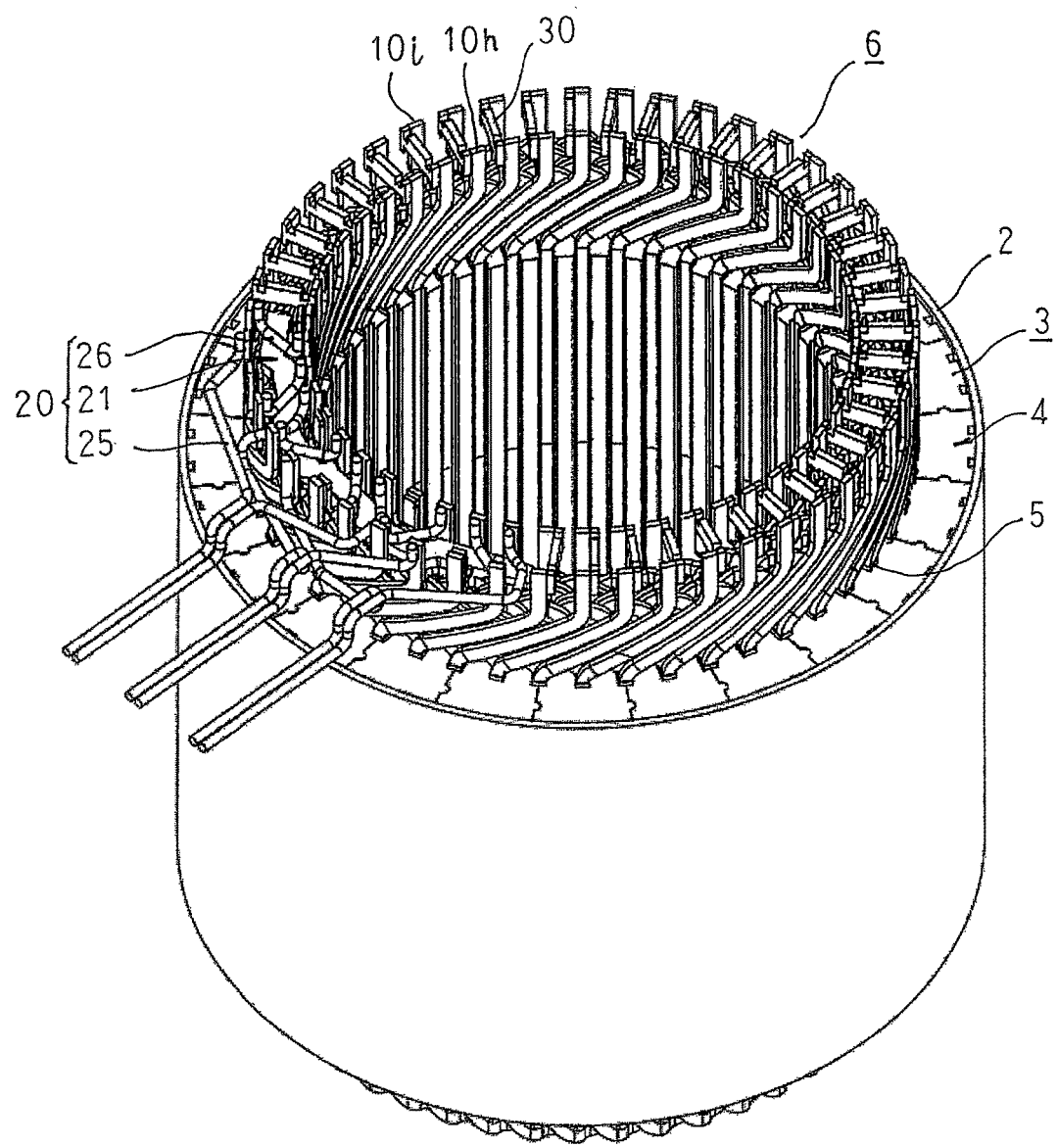
FIG. 1 is an oblique projection that shows a rotary electric machine stator according to Embodiment 1 of the present invention.
Figure 2:
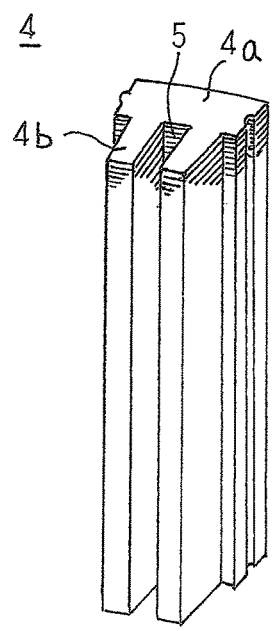
FIG. 2 is an oblique projection that shows a core block that constitutes part of a stator core in the rotary electric machine stator according to Embodiment 1.
Figure 3:
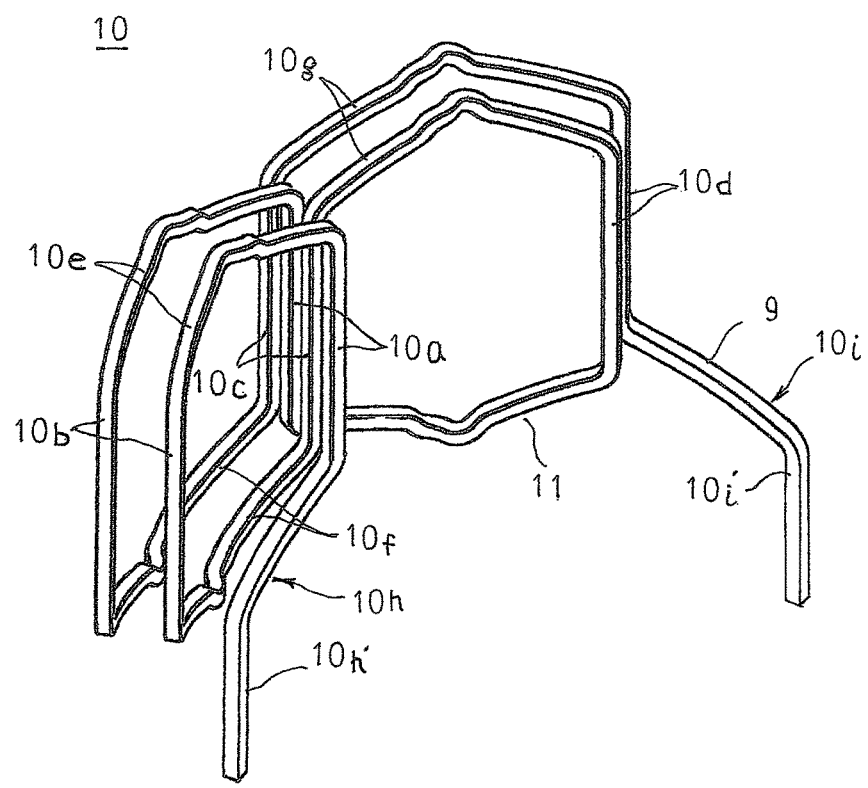
FIG. 3 is an oblique projection that shows a coil body that constitutes part of a stator winding in the rotary electric machine stator according to Embodiment 1.
Figure 4:
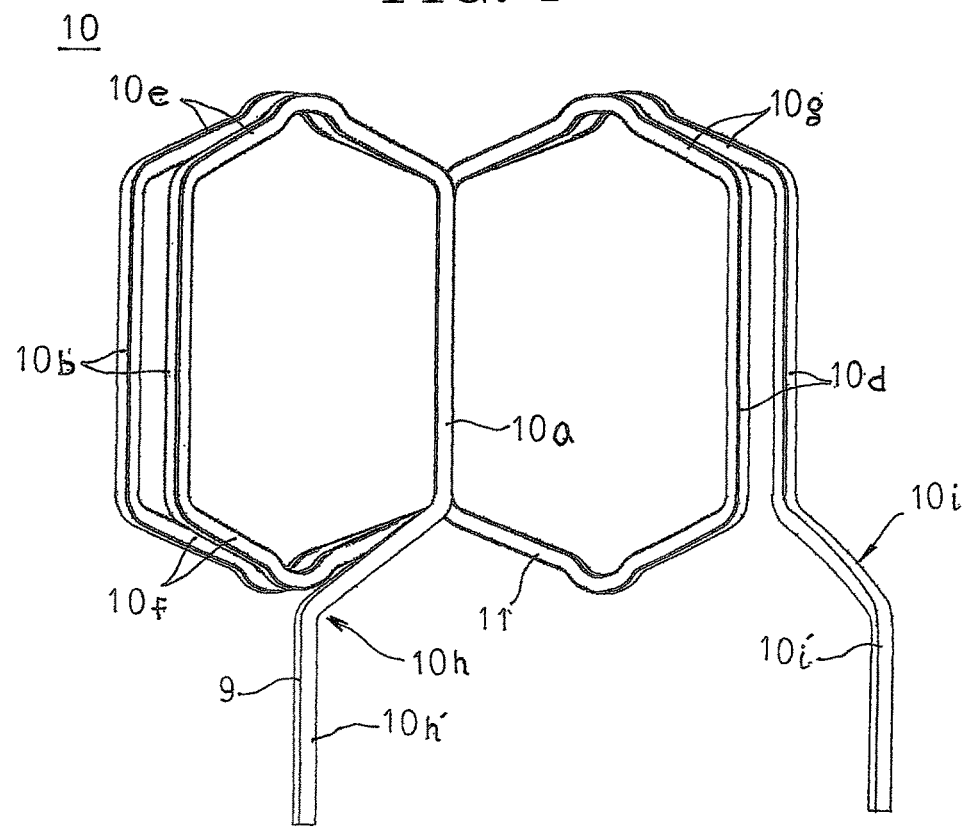
FIG. 4 is a front elevation that shows the coil body that constitutes part of the stator winding in the rotary electric machine stator according to Embodiment 1.
Figure 5:
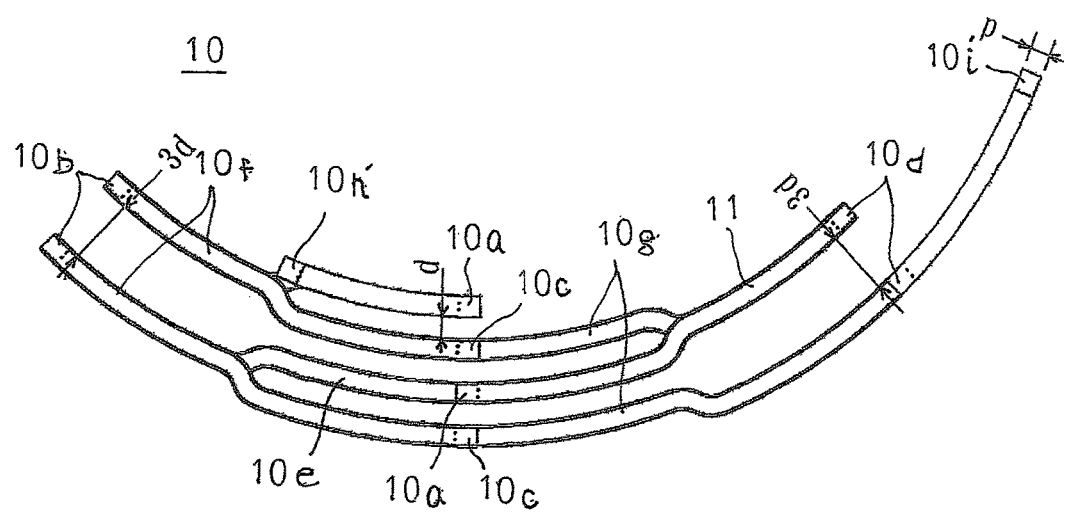
FIG. 5 is an end elevation viewed from a side near second coil ends that shows the coil body that constitutes part of the stator winding in the rotary electric machine stator according to Embodiment 1.
Figure 6:
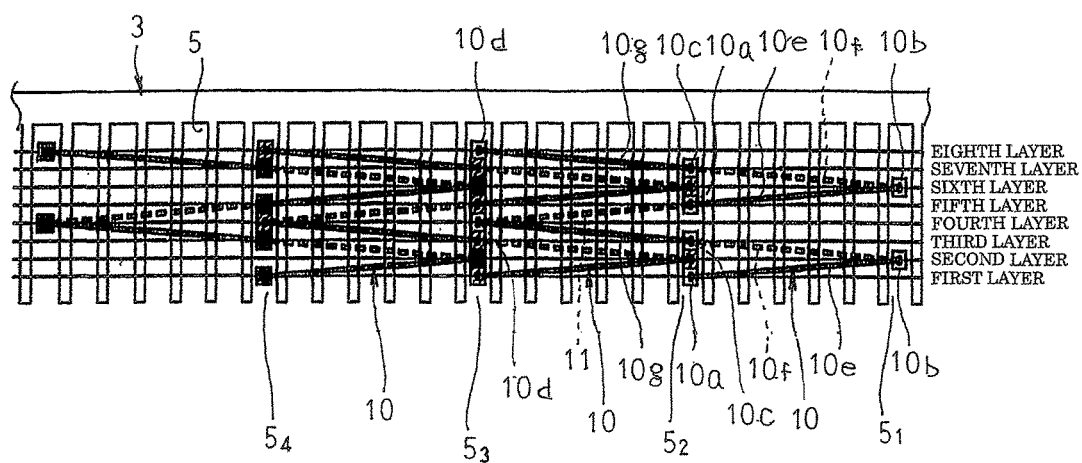
FIG. 6 is a partial end elevation viewed from a side near second coil ends that shows a state in which three coil bodies that constitute part of the stator winding in the rotary electric machine stator according to Embodiment 1 are mounted into the stator core so as to share a single slot.
Figure 7:
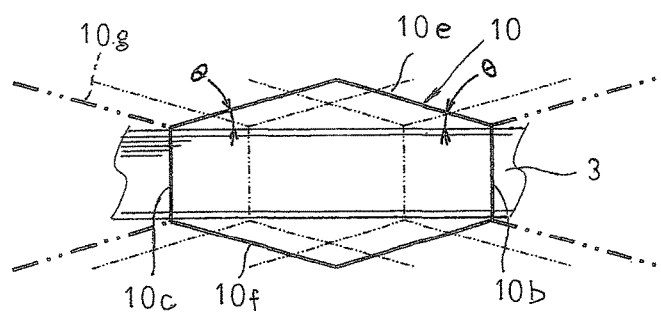
FIG. 7 is a developed projection viewed from radially outside that shows a coil body that is mounted to the stator core in the rotary electric machine stator according to Embodiment 1.
Figure 8:
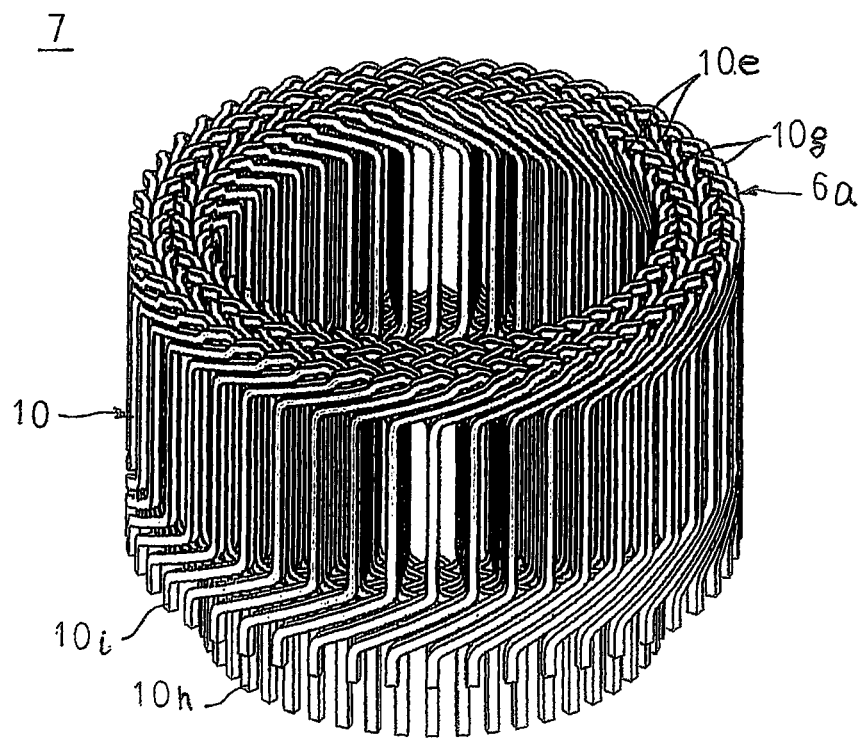
FIG. 8 is an oblique projection that shows a winding assembly that constitutes part of a stator winding in the rotary electric machine stator according to Embodiment 1.
Figure 9:
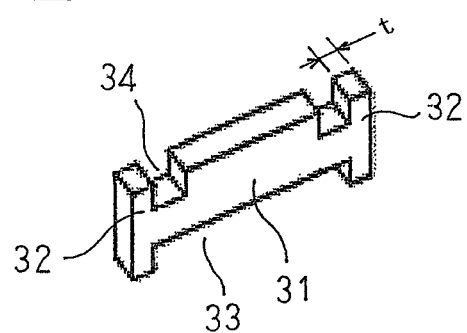
FIG. 9 is an oblique projection that shows a connecting conductor in the rotary electric machine stator according to Embodiment 1.
Figure 10:
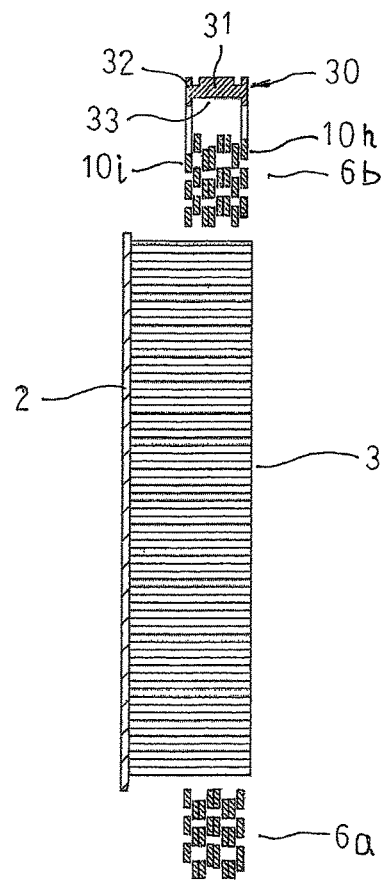
FIG. 10 is a partial cross section that explains a joining method for the coil bodies that uses the connecting conductor in the rotary electric machine stator according to Embodiment 1.
Figure 11:
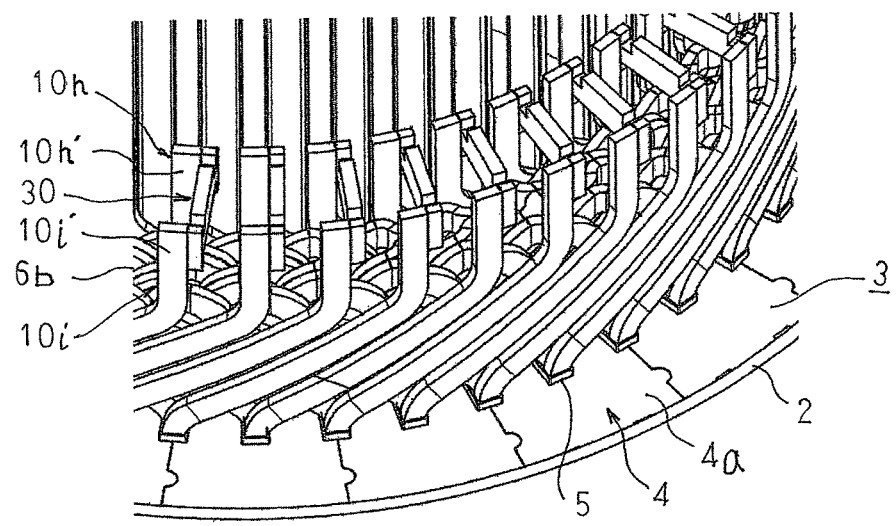
FIG. 11 is a partial oblique projection that shows a state in which coil bodies are connected by the connecting conductors in the rotary electric machine stator according to Embodiment 1.
Figure 12:
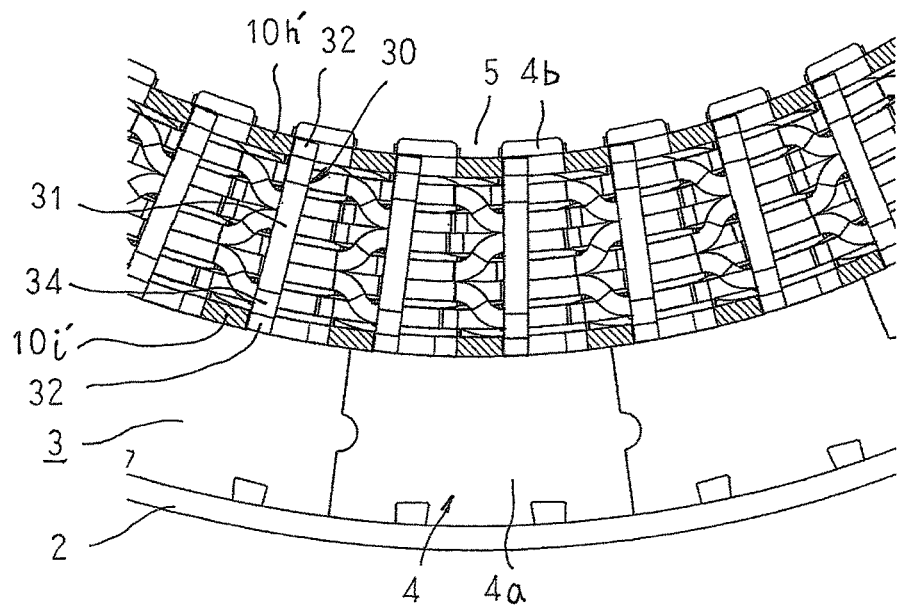
FIG. 12 is a partial end elevation that shows the state in which the coil bodies are connected by the connecting conductors in the rotary electric machine stator according to Embodiment 1.
Figure 13:
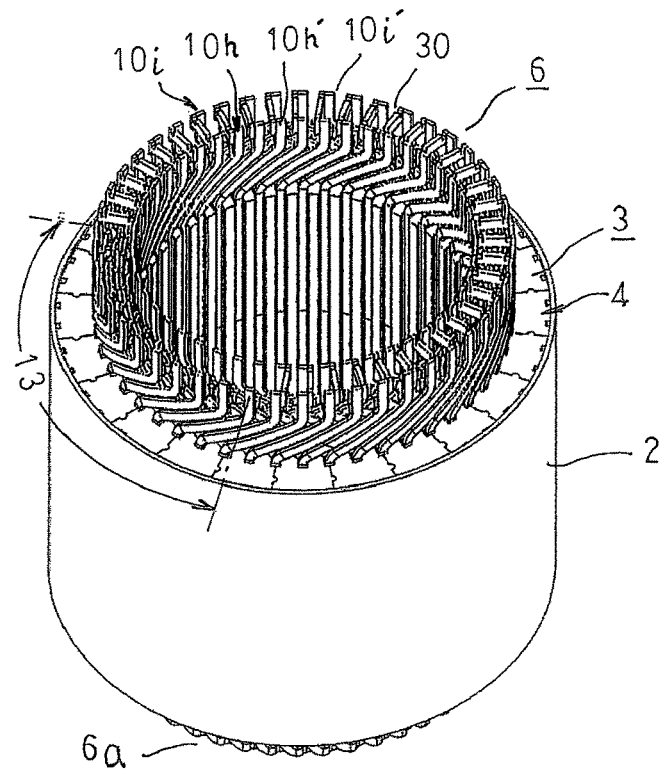
FIG. 13 is an oblique projection that shows the state in which the coil bodies are connected by the connecting conductors in the rotary electric machine stator according to Embodiment 1.
Figure 14:
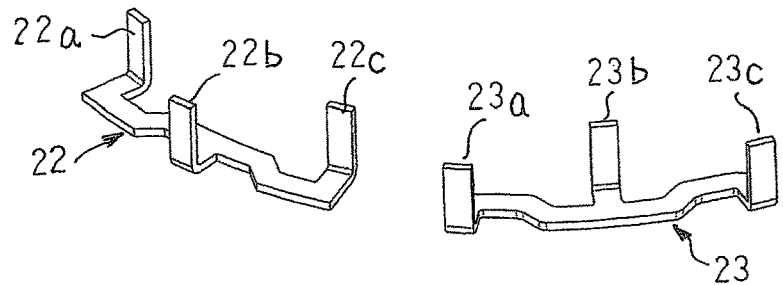
FIG. 14 is an oblique projection that shows first and second neutral point connecting busbars in the rotary electric machine stator according to Embodiment 1.
Figure 15:
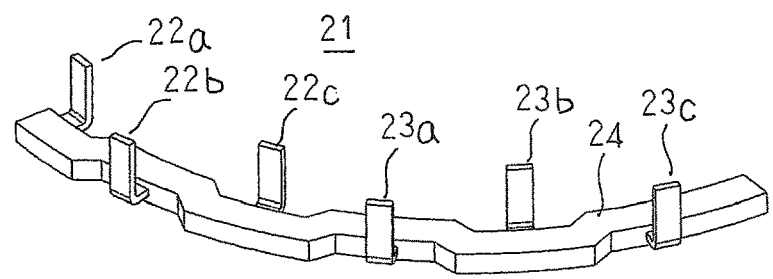
FIG. 15 is an oblique projection that shows a neutral point connecting plate in the rotary electric machine stator according to Embodiment 1.
Figure 16:
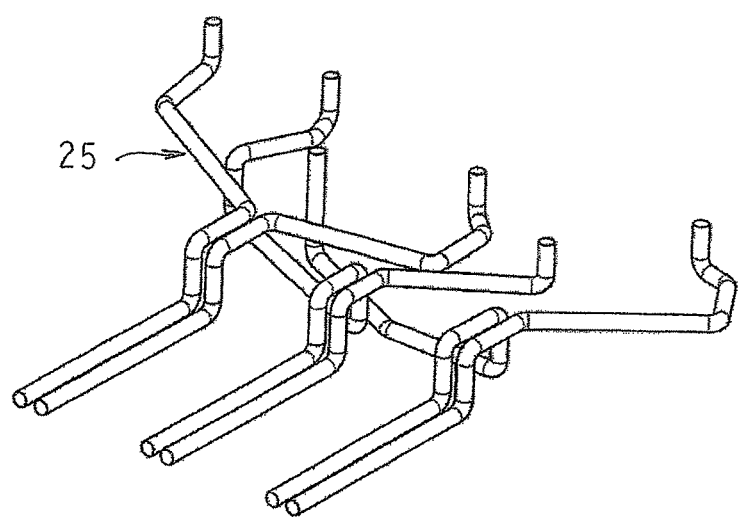
FIG. 16 is an oblique projection that shows electric power supplying coils in the rotary electric machine stator according to Embodiment 1.
Figure 17:
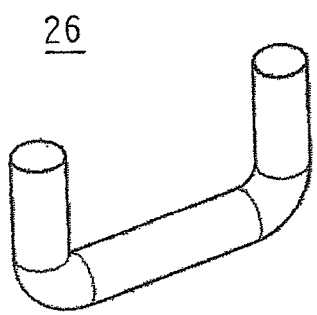
FIG. 17 is an oblique projection that shows a connecting coil in the rotary electric machine stator according to Embodiment 1.
Figure 18:
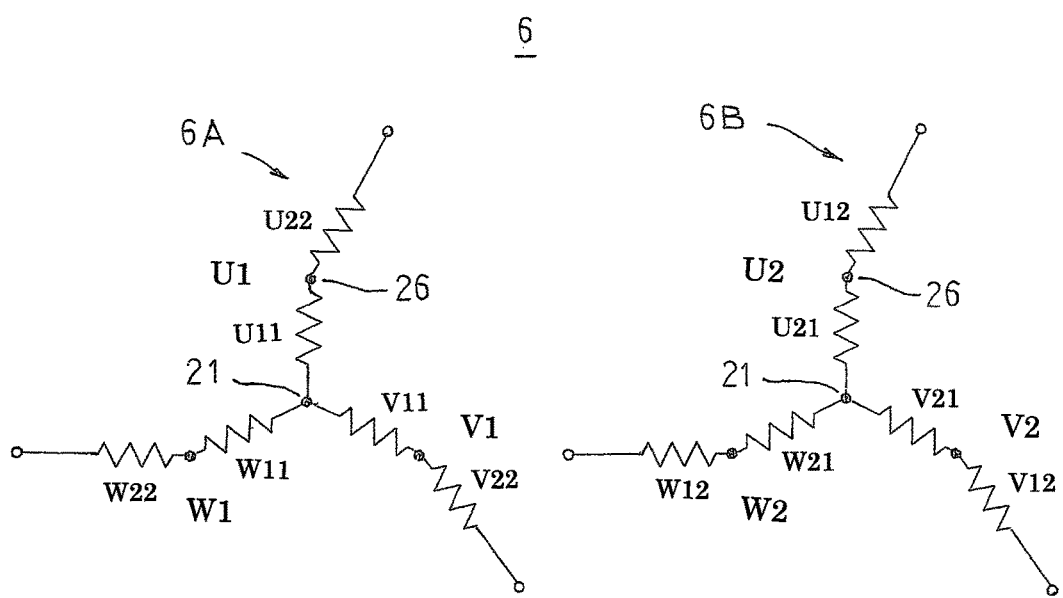
FIG. 18 is shows connection diagrams for the stator winding in the rotary electric machine stator according to Embodiment 1.

FIG. 1 is an oblique projection that shows a rotary electric machine stator according to Embodiment 1 of the present invention, FIG. 2 is an oblique projection that shows a core block that constitutes part of a stator core in the rotary electric machine stator according to Embodiment 1, FIG. 3 is an oblique projection that shows a coil body that constitutes part of a stator winding in the rotary electric machine stator according to Embodiment 1, FIG. 4 is a front elevation that shows the coil body that constitutes part of the stator winding in the rotary electric machine stator according to Embodiment 1, FIG. 5 is an end elevation viewed from a side near second coil ends that shows the coil body that constitutes part of the stator winding in the rotary electric machine stator according to Embodiment 1, FIG. 6 is a partial end elevation viewed from a side near second coil ends that shows a state in which three coil bodies that constitute part of the stator winding in the rotary electric machine stator according to Embodiment 1 are mounted into the stator core so as to share a single slot, FIG. 7 is a developed projection viewed from radially outside that shows a coil body that is the stator core in the rotary electric machine stator according to Embodiment 1, FIG. 8 is an oblique projection that shows a winding assembly that constitutes part of a stator winding in the rotary electric machine stator according to Embodiment 1, FIG. 9 is an oblique projection that shows a connecting conductor in the rotary electric machine stator according to Embodiment 1, FIG. 10 is a partial cross section that explains a joining method for the coil bodies that uses the connecting conductor in the rotary electric machine stator according to Embodiment 1, FIG. 11 is a partial oblique projection that shows a state in which coil bodies are connected by the connecting conductors in the rotary electric machine stator according to Embodiment 1, FIG. 12 is a partial end elevation that shows a state in which coil bodies are connected by the connecting conductor in the rotary electric machine stator according to Embodiment 1, FIG. 13 is an oblique projection that shows a state in which coil bodies are connected by the connecting conductors in the rotary electric machine stator according to Embodiment 1, FIG. 14 is an oblique projection that shows first and second neutral point connecting busbars in the rotary electric machine stator according to Embodiment 1, FIG. 15 is an oblique projection that shows a neutral point connecting plate in the rotary electric machine stator according to Embodiment 1, FIG. 16 is an oblique projection that shows electric power supplying coils in the rotary electric machine stator according to Embodiment 1, FIG. 17 is an oblique projection that shows a connecting coil in the rotary electric machine stator according to Embodiment 1, and FIG. 18 is shows connection diagrams for the stator winding in the rotary electric machine stator according to Embodiment 1. Moreover, In FIG. 12, hatching has been applied to end surfaces of tip portions of winding ends to facilitate explanation.

In FIG. 1, a stator 1 is a rotary electric machine stator for an electric motor or a generator, etc., and includes: an annular stator core 3; a stator winding 6 that is mounted to the stator core 3; and connecting members 20 and connecting conductors 30 that connect the stator winding 6. Here, to facilitate explanation, the number of slots in the stator core 3 is forty-eight, and the stator winding is a three-phase winding. Furthermore, slots 5 are formed on the stator core 3 at a ratio of two slots per phase per pole.

As shown in FIG. 2, core blocks 4 are configured by dividing the annular stator core 3 into twenty-four equal sections circumferentially, are produced by laminating and integrating silicon steel sheets, and include: a core back portion 4a that has a circular arc-shaped cross section; and two teeth 4b that each project radially inward from an inner circumferential wall surface of the core back portion 12a so as to be separated in a circumferential direction. The stator core 3 is produced by arranging twenty-four core blocks 4 into an annular shape circumferentially by butting together circumferential side surfaces of the core back portion 4a such that the teeth 4b are oriented radially inward, and integrating them by shrink-fitting them, or press-fitting them, etc., into a cylindrical frame 2. The slots 5, which are formed by the core back portions 4a and the teeth 4b, are arranged at a uniform angular pitch circumferentially so as to be open on an inner circumferential side.

The stator winding 6 includes forty-eight coil bodies 10 that are disposed at a pitch of one slot circumferentially around the stator core 3.

The coil bodies 10 are distributed windings that are produced by winding conductor wires 9 into edgewise windings, the conductor wires 9 being made of jointless continuous rectangular copper wire that is insulated using an enamel resin, for example. Specifically, as shown in FIGS. 3 through 5, the coil bodies 10 are configured such that two δ-shaped coil patterns that are constituted by a first rectilinear portion 10a, a first coil end portion 10e, a second rectilinear portion 10b, a second coil end portion 10f, a third rectilinear portion 10c, a third coil end portion 10g, and a fourth rectilinear portion 10d are arranged in a longitudinal direction of short sides of oblong cross sections of the conductor wires 9, and the fourth rectilinear portion 10d and the first rectilinear portion 10a are linked using a linking wire 11. The linking wires 11 constitute coil end portions, winding start end portions of the conductor wires 9 constitute winding ends 10h that function as first conductor terminals, and winding finish end portions constitute winding ends 10i that function as second conductor terminals.

In the coil bodies 10 that are configured in this manner, four first rectilinear portions 10a and third rectilinear portions 10c are arranged in a single column such that longitudinal directions of long sides of the oblong cross sections are oriented in a circumferential direction so as to leave gaps d in the longitudinal direction of the short sides of the oblong cross sections. Two second rectilinear portions 10b are arranged so as to be separated by an angular pitch of six slots in a first circumferential direction from the column of first rectilinear portions 10a and third rectilinear portions 10c such that longitudinal directions of long sides of the oblong cross sections are oriented in a circumferential direction so as to leave a gap 3d in the longitudinal direction of the short sides of the oblong cross sections. Two fourth rectilinear portions 10d are arranged so as to be separated by an angular pitch of six slots in a second circumferential direction from the column of first rectilinear portions 10a and third rectilinear portions 10c such that longitudinal directions of long sides of the oblong cross sections are oriented in a circumferential direction so as to leave a gap 3d in the longitudinal direction of the short sides of the oblong cross sections. Moreover, an angular pitch of six slots is a pitch between slot centers of slots 5 on two sides of six consecutive teeth 4b, and in Embodiment 1 corresponds to a pitch of one magnetic pole. Furthermore, d is a length of the short sides of the oblong cross sections of the conductor wires 9.

FIG. 6 shows a state in which three coil bodies 10 are each mounted into the stator core 3 so as to share one slot 5. FIG. 7 shows the state in which the coil bodies 10 are mounted into the stator core when viewed from radially outside. In FIG. 6, three slots 5 that line up at an angular pitch of six slots circumferentially will be designated a first slot $5_1$, a second slot $5_2$, and a third slot $5_3$, in order circumferentially for convenience.

In FIGS. 6 and 7, using one coil body 10 as an example, a first coil end portion 10e that extends outward at a second axial end from a first rectilinear portion 10a in a first layer from a slot opening side of the second slot $5_2$ (a radially innermost position) extends toward the first slot $5_1$ circumferentially at an angle of inclination θ, changes lanes (hereinafter "is shifted") radially outward at a vertex portion by a distance d, subsequently extends toward the first slot $5_1$ circumferentially at a reverse angle of inclination θ, and is linked to a second rectilinear portion 10b in a second layer from the slot opening side of the first slot $5_1$. Next, a second coil end portion 10f that extends outward at a first axial end from the second rectilinear portion 10b in the second layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a third layer from the slot opening side of the second slot $5_2$.

Next, a third coil end portion 10g that extends outward at the second axial end from the third rectilinear portion 10c in the third layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in a fourth layer from the slot opening side of the third slot $5_3$.

Next, a linking portion 11 that extends outward at the first axial end from the fourth rectilinear portion 10d in the fourth layer from the slot opening side of the third slot $5_3$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a first rectilinear portion 10a in a fifth layer from the slot opening side of the second slot $5_2$. A first coil end portion 10e that extends outward at the second axial end from the first rectilinear portion 10a in the fifth layer from the slot opening side of the second slot $5_2$ extends toward the first slot $5_1$ circumferentially at an angle of inclination θ, is shifted radially outward at a vertex portion by a distance d, subsequently extends toward the first slot $5_1$ circumferentially at a reverse angle of inclination θ, and is linked to a second rectilinear portion 10b in a sixth layer from the slot opening side of the first slot $5_1$.

Next, the second coil end portion 10f that extends outward at the first axial end from the second rectilinear portion 10b in the sixth layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a seventh layer from the slot opening side of the second slot $5_2$. Next, a third coil end portion 10g that extends outward at the second axial end from the third rectilinear portion 10c in the seventh layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in an eighth layer (a radially outermost position) from the slot opening side of the third slot $5_3$.

Thus, the first rectilinear portion 10a in the first layer of the second slot $5_2$ and the second rectilinear portion 10b in the second layer of the first slot $5_1$ are linked by the first coil end portion 10e, the second rectilinear portion 10b in the second layer of the first slot $5_1$ and the third rectilinear portion 10c in the third layer of the first slot $5_1$ are linked by the second coil end portion 10f, and the third rectilinear portion 10c in the third layer of the second slot $5_2$ and the fourth rectilinear portion 10d in the fourth layer of the third slot $5_3$ are linked by the third coil end portion 10g, to constitute a δ-shaped coil pattern.

In addition, the first rectilinear portion 10a in the fifth layer of the second slot $5_2$ and the second rectilinear portion 10b in the sixth layer of the first slot $5_1$ are linked by the first coil end portion 10e, the second rectilinear portion 10b in the sixth layer of the first slot $5_1$ and the third rectilinear portion 10c in the seventh layer of the first slot $5_1$ are linked by the second coil end portion 10f, and the third rectilinear portion 10c in the seventh layer of the second slot $5_2$ and the fourth rectilinear portion 10d in the eighth layer of the third slot $5_3$ are linked by the third coil end portion 10g, to constitute a δ-shaped coil pattern.

Thus, a coil body 10 is configured by winding a conductor wire 9 into a first slot $5_1$, a second slot $5_2$, and a third slot $5_3$ that line up at an angular pitch of six slots circumferentially, so as to repeat a δ-shaped coil pattern for two iterations in a radial direction, the δ-shaped coil pattern being formed by inserting the conductor wire 9 sequentially in order of the second slot $5_2$, the first slot $5_1$, the second slot $5_2$, and the third slot $5_3$ so as to alternate an axial direction of insertion into the first slot $5_1$, the second slot $5_2$, and the third slot $5_3$.

The coil body 10 is configured by linking the two δ-shaped coil patterns using a linking wire 11 so as to be arranged into two layers in a radial direction. In other words, the coil body 10 is produced by winding the conductor wire 9 in such a way that the two δ-shaped coil patterns become continuous. The first through fourth rectilinear portions 10a, 10b, 10c, and 10d are housed in third slots $5_3$ that are shared by three coil bodies 10 such that the longitudinal directions of the long sides of the rectangular cross sections of the conductor wires 9 are oriented circumferentially so as to line up in single columns in a radial direction.

Forty-eight coil bodies 10 that are configured in this manner are arranged concentrically at a pitch of one slot to produce the winding assembly 7 that is shown in FIG. 8. At a second axial end of the winding assembly 7, a layer of first coil end portions 10e in which the first coil end portions 10e are arranged circumferentially at a pitch of one slot and a layer of third coil end portions 10g in which the third coil end portions 10g are arranged circumferentially at a pitch of one slot are arranged alternately in four layers in a radial direction to constitute first coil ends 6a. At a first axial end of the winding assembly 7, a layer of second coil end portions 10f in which the second coil end portions 10f are arranged circumferentially at a pitch of one slot and a layer of linking wires 11 in which the linking wires 11 are arranged circumferentially at a pitch of one slot are arranged alternately in three layers in a radial direction to constitute second coil ends 6b. Winding ends 10h each extend axially outward from a radially inner side of the second coil ends 6b, and are arranged circumferentially at a pitch of one slot, and winding ends 10i each extend axially outward from a radially outer side of the second coil ends 6b, and are arranged circumferentially at a pitch of one slot.

Shapes of the winding ends 10h and 10i of the coil bodies 10 will now be explained using FIGS. 3 through 6. The winding ends 10h that extend outward near the second coil ends 6b from the first rectilinear portions 10a in the first layer of the second slots $5_2$ are formed so as to extend toward the first slots $5_1$ circumferentially at an angle of inclination θ and then be bent at vertex portions (intermediate positions between the first slots $5_1$ and the second slots $5_2$) to extend axially outward parallel to a central axis of the stator core 3. The winding ends 10i that extend outward near the second coil ends 6b from the fourth rectilinear portions 10d in the eighth layer of the third slots $5_3$ are formed so as to extend toward the fourth slots $5_4$ circumferentially at an angle of inclination θ and then be bent at vertex portions (intermediate positions between the third slots $5_3$ and the fourth slots $5_4$) to extend axially outward parallel to the central axis of the stator core 3.

Thus, the circumferential positions of the tip portions 10i' of the winding ends 10i that protrude axially outward from the coil bodies 10 in which the first rectilinear portions 10a are housed in the second slots $5_2$ align approximately with the circumferential positions of the tip portions 10h' of the winding ends 10h that protrude axially outward from the coil bodies 10 in which the first rectilinear portions 10a are housed in the fourth slots $5_4$. In other words, the circumferential positions of the tip portions 10i' that protrude axially outward from the winding ends 10i of first coil bodies 10 align approximately with the circumferential positions of the tip portions 10h' that protrude axially outward from the winding ends 10h of second coil bodies 10 that are two pole pitches away. Then, insulating coatings are removed from the tip portions 10h' and 10i' of the winding ends 10h and 10i.

Next, a connection method for the winding assembly 7 will be explained by allotting, for convenience, Slot Numbers 1, 2, etc., through 48 in circumferential order to the forty-eight slots 5 that are disposed circumferentially around the stator core 3.

Eight coil bodies 10 are first mounted into a slot group at Slot Numbers (1+6n), where n is a natural number that is greater than or equal to zero and less than or equal to seven. Four coil bodies 10 that are arranged at a pitch of two magnetic poles among the eight coil bodies 10 are respectively connected in series using connecting conductors 30 such as that shown in FIG. 9 to form small coil groups U11 and U12.

Next, eight coil bodies 10 are mounted into a slot group at Slot Numbers (2+6n). Four coil bodies 10 that are arranged at a pitch of two magnetic poles among the eight coil bodies 10 are respectively connected in series using connecting conductors 30 to form small coil groups U21 and U22.

Eight coil bodies 10 are mounted into a slot group at Slot Numbers (3+6n). Four coil bodies 10 that are arranged at a pitch of two magnetic poles among the eight coil bodies 10 are respectively connected in series using connecting conductors 30 to form small coil groups V11 and V12.

Next, eight coil bodies 10 are mounted into a slot group at Slot Numbers (4+6n). Four coil bodies 10 that are arranged at a pitch of two magnetic poles among the eight coil bodies 10 are respectively connected in series using connecting conductors 30 to form small coil groups V21 and V22.

Eight coil bodies 10 are mounted into a slot group at Slot Numbers (5+6n). Four coil bodies 10 that are arranged at a pitch of two magnetic poles among the eight coil bodies 10 are respectively connected in series using connecting conductors 30 to form small coil groups W11 and W12.

Next, eight coil bodies 10 are mounted into a slot group at Slot Numbers (6+6n). Four coil bodies 10 that are arranged at a pitch of two magnetic poles among the eight coil bodies 10 are respectively connected in series using connecting conductors 30 to form small coil groups W21 and W22.

Next, a connecting method for the coil bodies 10 that uses the connecting conductors 30 will be explained with reference to FIGS. 9 through 13.

As shown in FIG. 9, connecting conductors 30 are first produced by applying a machining process or the cutting process to a flat, rectangular copper sheet, for example, and include: a linking portion 31; a pair of connecting portions 32 that are formed integrally on two longitudinal end portions of the linking portion 31; a recess portion 33 that is formed by hollowing out a first long side of the linking portion 31; and notch portions 34 that are formed near the two connecting portions 32 on a second long side of the linking portion 31. Moreover, in FIG. 9, t is a thickness of the connecting portions 32 in a longitudinal direction of the connecting conductor 30, and is equal to the length d of the short sides of the oblong cross section of the conductor wire 9.

The stator core 3 is disposed such that the central axis is vertical so as to orient the second coil ends 6b upward. Circumferential positions of the tip portions 10i' of first coil bodies 10 that protrude axially outside the winding ends 10i align approximately with circumferential positions of the tip portions 10h' that protrude axially outside the winding ends 10h of second coil bodies 10 that are two pole pitches away. Thus, as shown in FIG. 10, the connecting conductors 30 are disposed so as to cross over in a radial direction axially outside the second coil ends 6b such that the recess portions 33 face toward the second coil ends 6b. Then, as shown in FIGS. 11 and 12, the connecting conductors 30 are disposed such that the pairs of connecting portions 32 are parallel to the tip portions 10h' and 10i' and respectively contact circumferential side surfaces of the tip portions 10h' and 10i' of the winding ends 10h and 10i whose circumferential positions are approximately aligned. Here, the surfaces of the contacting tip portions 10h' and 10i' of the winding ends 10h and 10 and the connecting portions 32 that face vertically upward are flush. Radial thicknesses of the contacting tip portions 10h' and 10i' of the winding ends 10h and 10i and the connecting portions 32 match.

Next, the connecting portions 32 of the connecting conductors 30 are joined together with the tip portions 10h' and 10i' of the winding ends 10h and 10i that are separated by a pitch of two magnetic poles by TIG welding.

Specifically, a clamping tool (not shown) is inserted from radially outside, and fixes a contacting tip portion 10i' of a winding end 10i and a connecting portion 32 by clamping from two circumferential sides. Then, in an Argon atmosphere, a tip of a welding rod (not shown) is placed in contact with a contacting portion between the tip portion 10i' of the winding end 10i and the connecting portion 32 from above, and a welding torch (not shown) is brought close to the upper surface of the tip portion 10i' of the winding end 10i and the connecting portion 32 from above and an arc is generated. Thus, upper surface portions of the tip portion 10i' of the winding end 10i and the connecting portion 32 and the welding rod are melted by arc heat therefrom such that welding is performed.

Similarly, the clamping tool is inserted from radially outside, and fixes a contacting tip portion 10h' of a winding end 10h and a connecting portion 32 by clamping from two circumferential sides. Then, in an Argon atmosphere, the tip of the welding rod is placed in contact with a contacting portion between the tip portion 10h' of the winding end 10h and the connecting portion 32 from above, and the welding torch is brought close to the upper surface of the tip portion 10h' of the winding end 10h and the connecting portion 32 from above and an arc is generated. Thus, upper surface portions of the tip portion 10h' of the winding end 10h and the connecting portion 32 and the welding rod are melted by arc heat therefrom such that welding is performed.

Twelve small coil groups U11, U12, U21, U22, V11, V12, V21, V22, W11, W12, W21, and W22 that are each configured by connecting in series four coil bodies 10 that are arranged at a pitch of two magnetic poles circumferentially around the stator core 3 are produced thereby.

As shown in FIG. 13, the tip portions 10h' of the winding ends 10h, which constitute first ends of the twelve small coil groups U11, U12, U21, U22, V11, V12, V21, V22, W11, W12, W21, and W22, are arranged at a pitch of one slot circumferentially around a radially inner side of a circular arc-shaped region 13 that extends in a circular arc shape circumferentially around the second coil ends 6b, and the tip portions 10i' of the winding ends 10i, which constitute second ends, are arranged at a pitch of one slot circumferentially around a radially outer side of the circular arc-shaped region 13 of the second coil ends 6b. The connecting conductors 30, which are disposed radially, are arranged at a pitch of one slot circumferentially around a C-shaped region that is positioned on opposite sides of the circular arc-shaped region 13 on which the tip portions 10h' and 10i' of the winding ends 10h and 10i of the twelve small coil groups U11, U12, U21, U22, V11, V12, V21, V22, W11, W12, W21, and W22 are arranged circumferentially.

Connection of the twelve small coil groups U11, U12, U21, U22, V11, V12, V21, V22, W11, W12, W21, and W22 is performed using the connecting members 20 in the circular arc-shaped region 13 in which the tip portions 10h' and 10i' of the winding ends 10h and 10i of the twelve small coil groups U11, U12, U21, U22, V11, V12, V21, V22, W11, W12, W21, and W22 are arranged circumferentially.

The connecting members 20 include: a neutral point connecting plate 21; electric power supplying coils 25 that are connected to electric power supplying portions of the stator winding 6 for supplying electric power to the stator winding 6 from an external electric power supply; and connecting coils 26 that connect between similar or identical phase small coil groups. First and second neutral point connecting busbars 22 and 23 are produced by applying punching and bending to steel sheets, as shown in FIG. 14. As shown in FIG. 15, the neutral point connecting plate 21 is produced by insert-molding the first and second neutral point connecting busbars 22 and 23 using an insulating resin 24. As shown in FIG. 16, the electric power supplying coils 25 are produced by bending and shaping conducting wires that have circular cross sections. As shown in FIG. 17, the connecting coils 26 are produced by bending and shaping conducting wires that have circular cross sections into a U shape.

A connecting coil 26 links the winding ends 10h and 10i that are end portions of the small coil groups U11 and U22, which are offset by 30 electrical degrees, to produce a U1-phase winding in which the small coil groups U11 and U22 are connected in series. A connecting coil 26 links the winding ends 10h and 10i that are end portions of the small coil groups V11 and V22, which are offset by 30 electrical degrees, to produce a V1-phase winding in which the small coil groups V11 and V22 are connected in series. A connecting coil 26 links the winding ends 10h and 10i that are end portions of the small coil groups W11 and W22, which are offset by 30 electrical degrees, to produce a W1-phase winding in which the small coil groups W11 and W22 are connected in series.

A connecting coil 26 links the winding ends 10h and 10i that are end portions of the small coil groups U21 and U12, which are offset by 30 electrical degrees, to produce a U2-phase winding in which the small coil groups U21 and U12 are connected in series. A connecting coil 26 links the winding ends 10h and 10i that are end portions of the small coil groups V21 and V12, which are offset by 30 electrical degrees, to produce a V2-phase winding in which the small coil groups V21 and V12 are connected in series. A connecting coil 26 links the winding ends 10h and 10i that are end portions of the small coil groups W21 and W12, which are offset by 30 electrical degrees, to produce a W2-phase winding in which the small coil groups W21 and W12 are connected in series.

The neutral point connecting plate 21 is disposed above the second coil ends 6b, and the terminals 22a, 22b, and 22c of the first neutral point connecting busbar 22 are joined to the winding ends 10h and 10i of the small coil groups U12, V12, and W12. In addition, the terminals 23a, 23b, and 23c of the second neutral point connecting busbar 23 are joined to the winding ends 10h and 10i of the small coil groups U22, V22, and W22. As shown in FIG. 18, a first three-phase alternating-current winding 6A that is configured by wye-connecting the U1-phase winding, the V1-phase winding, and the W1-phase winding and a second three-phase alternating-current winding 6B that is configured by wye-connecting the U2-phase winding, the V2-phase winding, and the W2-phase winding are formed thereby. In addition, the electric power supplying coils 25 are connected to the power supplying terminals of the first and second three-phase alternating-current windings 6A and 6B.

According to Embodiment 1, pairs of connecting portions 32 of connecting conductors 30 are disposed so as to be parallel to tip portions 10h' and 10i' of winding ends 10h and 10i that are separated by a pitch of two magnetic poles and so as to respectively contact circumferential side surfaces of the tip portions 10h' and 10i', and are welded to the winding ends 10h and 10i. Thus, during welding, a clamping tool can be inserted from radially outside or radially inside to clamp the connecting portions 32 and the tip portions 10h' and 10i' of the winding ends 10h and 10i that are lined up circumferentially from two circumferential sides. Thus, an axially outer side of the connecting portions 32 and the tip portions 10h' and 10i' of the winding ends 10h and 10i that are lined up circumferentially can be used as a welding work space, improving welding workability, and increasing productivity.

Because the clamping tool will not interfere with the welding work even if it clamps a vicinity of the tips of the connecting portions 32 and the tip portions 10h' and 10i' of the winding ends 10h and 10i that are lined up circumferentially, lengths of the connecting portions 32 and the tip portions 10h' and 10i' of the winding ends 10h and 10i that are lined up circumferentially can be made shorter, enabling coil end height to be reduced.

Because the tip portions 10h' and 10i' of the winding ends 10h and 10i are respectively arranged circumferentially so as to be parallel to the central axis of the stator core 3, the welding direction is in a single axial direction of the stator core 3. Consequently, it is not necessary to make the central axis of the stator core 3 horizontal, and turn the stator core 3 around the central axis while welding, improving welding workability. Furthermore, when TIG-welding, because welding can be performed simply by making the central axis of the stator core 3 vertical, and lowering the welding torch from above, the melted portions will not drip off, and the risk that the melted portions will be unbalanced is reduced, and stabilizing welding quality.

Because the connecting conductors 30 are disposed such that the recess portions 33 that are formed on the linking portions 31 face toward the coil ends 6b, the recess portions 33 form insertion spaces for a holding tool (not shown) for the connecting conductors 30, enabling contact between the holding tool and the coil ends 6b to be avoided during the welding work. Thus, the occurrence of damage to insulating coatings of the coil ends 6b that results from contact with the holding tool can be suppressed. Because electrical insulation distances between the connecting conductors 30 and the coil ends 6b can also be ensured by the recess portions 33, insulation reliability is increased.

Because the surfaces that face vertically upward on the tip portions 10h' and 10i' of the winding ends 10h and 10 and the connecting portions 32 that are joined together are flush, TIG welding is facilitated. Because radial thicknesses of the tip portions 10h' and 10i' of the winding ends 10h and 10i and the connecting portions 32 that are joined together match, TIG welding can be performed stably, stabilizing welding quality.

Because circumferential positions of the tip portions 10h' and 10i' of the winding ends 10h and 10i that are subject to connection are approximately aligned, a step of bending the linking portions 31 of the connecting conductors 30 radially is no longer required, enabling reductions in cost to be achieved.

Because the connecting conductors 30 do not protrude radially outward from the tip portions of the winding ends 10i, increases in radial dimensions of the coil ends 2b, which include the winding ends 10h and 10i, can be suppressed.

The tip portions 10h' and 10i' of the winding ends 10h and 10i that are joined together are connected using the connecting conductors 30, which are separate members. Thus, because it is not necessary to lead the winding ends 10h out by bending them radially outward in order to connect the winding ends 10h and 10i, the occurrence of damage to insulating coatings due to bending the winding ends 10h is eliminated, improving insulation performance. Because conductor length from a radially inner side to a radially outer side is shorter than when vicinities of the tips of the winding ends 10h are bent radially outward and connected to the winding ends 10*i*, rigidity of the coil ends is increased. In addition, if the vicinities of the tips of the winding ends 10*h* are bent radially outward and connected to the winding ends 10*i*, then loads that arise in the winding ends 10*h* and 10*i* due to vibration act on a single joint portion, but because the tip portions 10*h*' and 10*i*' of the winding ends 10*h* and 10*i* are connected using the connecting conductors 30, loads that arise in the winding ends 10*h* and 10*i* due to vibration are distributed between two joint portions, improving vibration resistance.

Moreover, in Embodiment 1 above, connecting conductors are produced by applying a machining process or a cutting process to a flat, rectangular copper sheet, but connecting conductors may be produced by applying a bending process to a wire material that has a rectangular cross section.

In Embodiment 1 above, recess portions are formed by hollowing out entire first long sides of linking portions of connecting conductors, but it is not necessary to hollow out the entire first long sides of the linking portions from a viewpoint of ensuring electrical insulation distances between the connecting conductors and the coil ends, provided that portions of the first long sides of the linking portions that face top portions of the coil ends are hollowed out.

Embodiment 2

Figure 19:
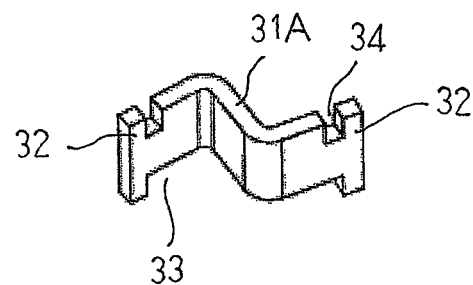
FIG. 19 is an oblique projection that shows a connecting conductor in a rotary electric machine stator according to Embodiment 2.
Figure 20:
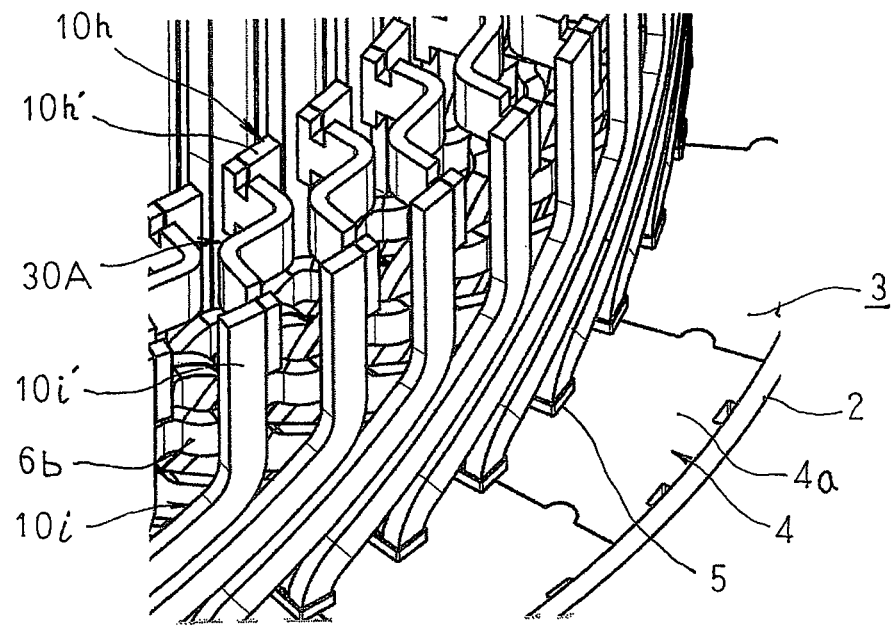
FIG. 20 is a partial oblique projection that shows a state in which coil bodies are connected by connecting conductors in the rotary electric machine stator according to Embodiment 2.
Figure 21:
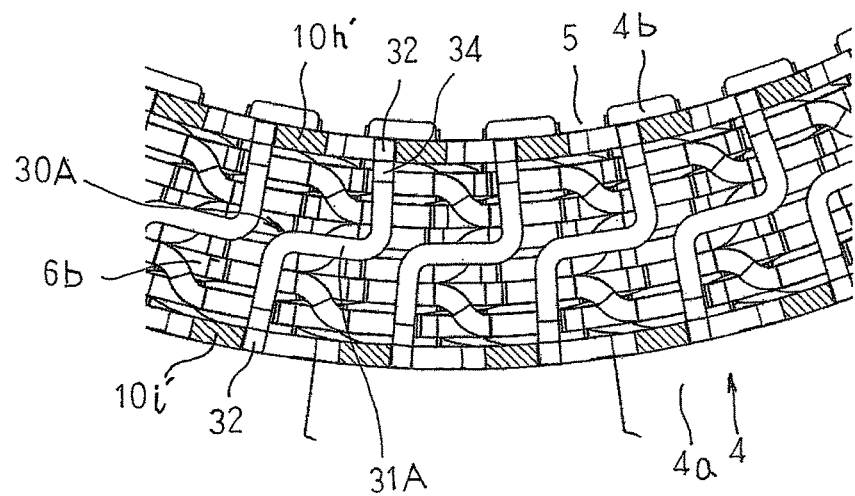
FIG. 21 is a partial end elevation that shows the state in which the coil bodies are connected by the connecting conductors in the rotary electric machine stator according to Embodiment 2.
Figure 22:
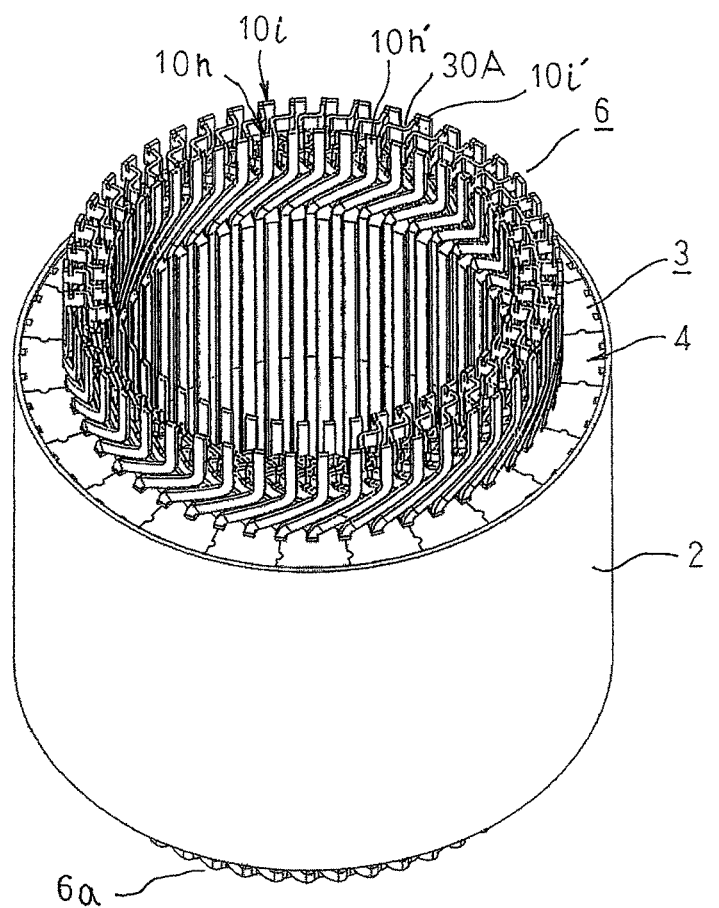
FIG. 22 is an oblique projection that shows the state in which the coil bodies are connected by the connecting conductors in the rotary electric machine stator according to Embodiment 2.

FIG. 19 is an oblique projection that shows a connecting conductor in a rotary electric machine stator according to Embodiment 2, FIG. 20 is a partial oblique projection that shows a state in which coil bodies are connected by connecting conductors in the rotary electric machine stator according to Embodiment 2, FIG. 21 is a partial end elevation that shows the state in which the coil bodies are connected by the connecting conductors in the rotary electric machine stator according to Embodiment 2, and FIG. 22 is an oblique projection that shows the state in which the coil bodies are connected by the connecting conductors in the rotary electric machine stator according to Embodiment 2.

In FIGS. 20 through 22, winding ends 10*i* that extend outward near second coil ends 6*b* from fourth rectilinear portions 10*d* in an eighth layer of slots 5 are formed so as to extend circumferentially at an angle of inclination θ and then be bent before reaching vertex portions to extend axially outward parallel to a central axis of a stator core 3. Thus, circumferential positions of tip portions 10*i*' that protrude axially outward from the winding ends 10*i* of first coil bodies 10 are offset circumferentially by a spacing that is slightly larger than an angular spacing of one slot relative to circumferential positions of tip portions 10*h*' that protrude axially outward from winding ends 10*h* of second coil bodies 10 that are two pole pitches away.

As shown in FIG. 19, linking portions 31A of connecting conductors 30A are formed by bending into a crank shape so as to conform to the amount of offset of the circumferential positions of the tip portions 10*h*' and 10*i*' of the winding ends 10*h* and 10*i* of the coil bodies 10 that are separated by a pitch of two magnetic poles.

Moreover, the rest of the configuration is formed in a similar or identical manner to that of Embodiment 1 above.

In Embodiment 2, the stator core 3 is disposed such that the central axis is vertical so as to orient the second coil ends 6*b* upward, in a similar or identical manner to Embodiment 1 above. Then, the connecting conductors 30A are disposed so as to cross over in a radial direction axially outside the second coil ends 6*b* such that the recess portions 33 face toward the second coil ends 6*b*. Then, as shown in FIGS. 20 through 22, the connecting conductors 30A are disposed such that the pairs of connecting portions 32 are parallel to the tip portions 10*h*' and 10*i*' and respectively contact circumferential side surfaces of the tip portions 10*h*' and 10*i*' of the winding ends 10*h* and 10*i* that are separated by a pitch of two magnetic poles. Here, the surfaces of the contacting tip portions 10*h*' and 10*i*' of the winding ends 10*h* and 10 and the connecting portions 32 that face vertically upward are flush. Radial thicknesses of the contacting tip portions 10*h*' and 10*i*' of the winding ends 10*h* and 10*i* and the connecting portions 32 match. Next, the connecting portions 32 of the connecting conductors 30A are joined together with the tip portions 10*h*' and 10*i*' of the winding ends 10*h* and 10*i* that are separated by a pitch of two magnetic poles by TIG welding.

Similar effects to those in Embodiment 1 above can also be achieved in Embodiment 2.

According to Embodiment 2, because the lengths of the inclined portions of the winding ends 10*i* that exit the slots and extend in the circumferential direction at an angle of inclination θ are shorter, the lengths of the conductor wires 9 that constitute the coil bodies 10 can be made shorter.

Embodiment 3

Figure 23:
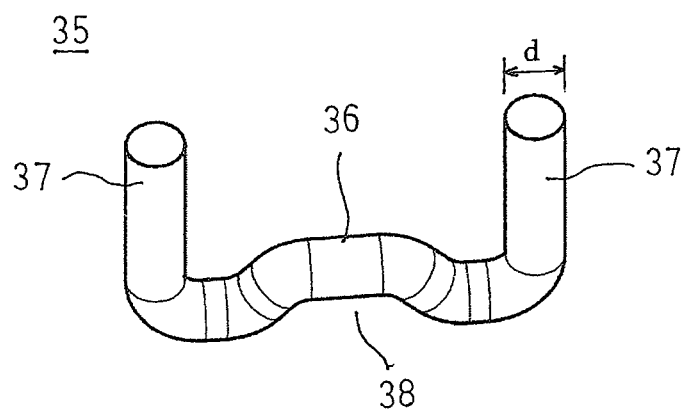
FIG. 23 is an oblique projection that shows a connecting conductor in a rotary electric machine stator according to Embodiment 3.
Figure 24:
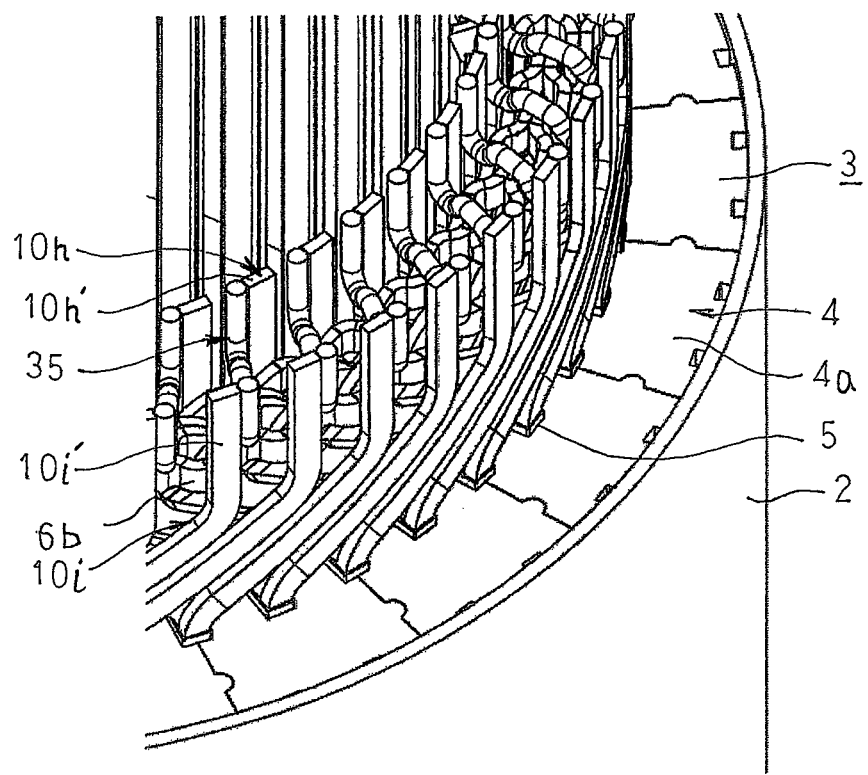
FIG. 24 is a partial oblique projection that shows a state in which coil bodies are connected by connecting conductors in the rotary electric machine stator according to Embodiment 3.
Figure 25:
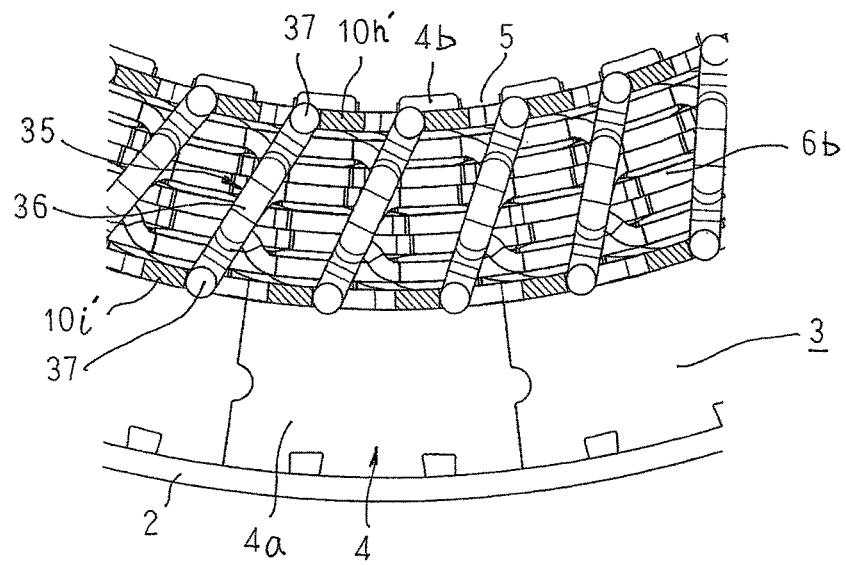
FIG. 25 is a partial end elevation that shows the state in which the coil bodies are connected by the connecting conductors in the rotary electric machine stator according to Embodiment 3.
Figure 26:
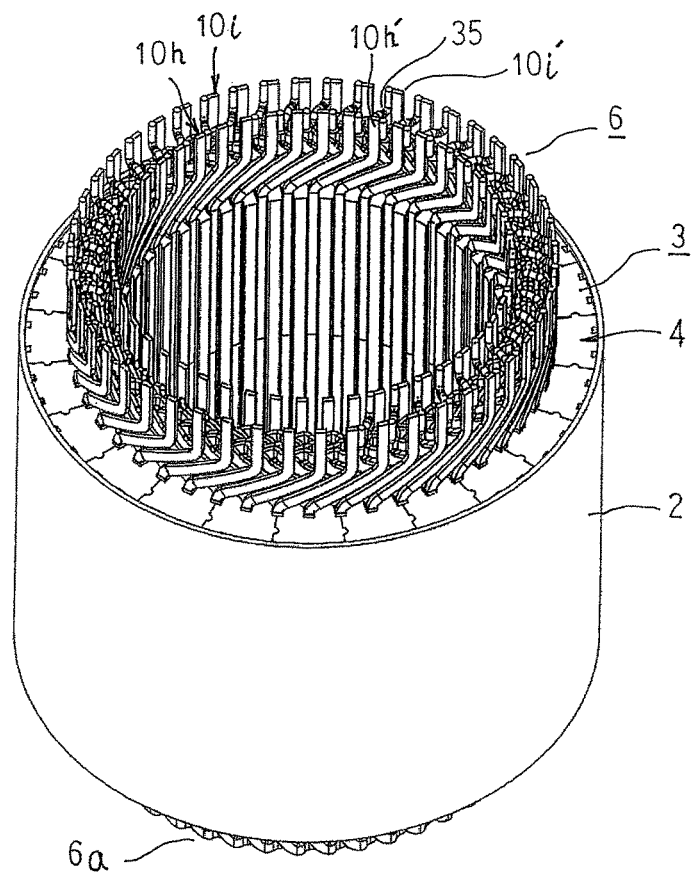
FIG. 26 is an oblique projection that shows the state in which the coil bodies are connected by the connecting conductors in the rotary electric machine stator according to Embodiment 3.

FIG. 23 is an oblique projection that shows a connecting conductor in a rotary electric machine stator according to Embodiment 3, FIG. 24 is a partial oblique projection that shows a state in which coil bodies are connected by connecting conductors in the rotary electric machine stator according to Embodiment 3, FIG. 25 is a partial end elevation that shows the state in which the coil bodies are connected by the connecting conductors in the rotary electric machine stator according to Embodiment 3, and FIG. 26 is an oblique projection that shows the state in which coil bodies are connected by the connecting conductors in the rotary electric machine stator according to Embodiment 3.

In FIG. 23, a connecting conductor 35 is produced by bending and shaping into a U shape a conducting wire that has a circular cross section that has a diameter d, and includes: a linking portion 36; a pair of connecting portions 37 that extend outward perpendicularly from two longitudinal end portions of the linking portion 36 in an axial direction; and a recess portion 38 that is formed by curving a longitudinally central portion of the linking portion 36 in the direction that the connecting portions 37 extend outward.

Moreover, Embodiment 3 is configured in a similar or identical manner to that of Embodiment 2 above except that the connecting conductors 35 are used instead of the connecting conductors 30A.

In Embodiment 3, the stator core 3 is disposed such that the central axis is vertical so as to orient the second coil ends 6*b* upward, in a similar or identical manner to Embodiment 2 above. Then, the connecting conductors 35 are disposed so as to cross over in a radial direction axially outside the second coil ends 6*b* such that the recess portions 38 face toward the second coil ends 6*b*. Then, as shown in FIGS. 24 through 26, the connecting conductors 35 are disposed such that the pairs of connecting portions 37 are parallel to the tip portions 10*h*' and 10*i*' and respectively contact circumferential side surfaces of the tip portions 10*h*' and 10*i*' of the winding ends 10*h* and 10*i* that are separated by a pitch of two magnetic poles. Here, the surfaces of the contacting tip portions 10*h*' and 10*i*' of the winding ends 10*h* and 10 and the connecting portions 37 that face vertically upward are flush. Radial thicknesses of the contacting tip portions 10*h*' and 10*i'* of the winding ends 10*h* and 10*i* and the connecting portions 37 match. Next, the connecting portions 37 of the connecting conductors 35 are joined together with the tip portions 10*h'* and 10*i'* of the winding ends 10*h* and 10*i* that are separated by a pitch of two magnetic poles by TIG welding.

Similar or identical effects to those in Embodiment 2 above can also be achieved in Embodiment 3.

Moreover, in each of the above embodiments, a stator core on which forty-eight slots are disposed is used, but the total number of slots is not limited to forty-eight. Furthermore, the slots are formed at a ratio of two slots per phase per pole, but the number of slots per phase per pole is not limited to two, and may be one, or may be three or greater. In Embodiment 1, the number of slots per phase per pole was two, and the spacing between the slots into which the rectilinear portions of the coil bodies are inserted was an angular pitch of six slots (a pitch of one magnetic pole), but if the number of slots per phase per pole is one, spacing between the slots into which the rectilinear portions of the coil bodies are inserted is an angular pitch of three slots (a pitch of one magnetic pole).

In each of the above embodiments, coil bodies are configured into full-pitch windings, but coil bodies may be configured into short-pitch windings or long-pitch windings.

In each of the above embodiments, coil bodies have been used in which two δ-shaped coil patterns that are arranged radially are formed continuously, but coil bodies may be formed using one δ-shaped coil pattern, or may be formed using three or more δ-shaped coil patterns that are arranged radially.

In each of the above embodiments, coil bodies have been used in which two δ-shaped coil patterns that are arranged radially are formed continuously, but the coil bodies are not limited to coil bodies in which two δ-shaped coil patterns that are arranged radially are formed continuously, provided that distributed coil bodies are disposed at a pitch of one slot so as to be equal in number to the number of slots in the stator core, and the winding start end portions of each of the coil bodies protrude axially outward from radially inside second coil ends, and winding finish end portions protrude axially outward from radially outside the second coil ends. For example, coil bodies may be used that are formed into a "hexagonal" coil pattern in which a conductor wire is wound helically for a plurality of turns.

In each of the above embodiments, coil bodies are used in which two δ-shaped coil patterns that are arranged radially are formed continuously, but U-shaped coil bodies may be used in which two rectilinear portions are linked by a coil end portion.

The invention claimed is:

1. A rotary electric machine stator comprising:
an annular stator core on which slots are arranged circumferentially; and
a stator winding that comprises a plurality of coil bodies that are each produced by shaping a jointless, continuous conductor wire on which an insulating coating is coated, wherein:
said plurality of coil bodies are each mounted to said stator core such that a first conductor terminal and a second conductor terminal of said conductor wire extend outward at a first axial end of said stator core from different radial positions inside different slots among said slots;
said first conductor terminal and said second conductor terminal each comprise a tip portion that extends in an axial direction of said stator core, and from which said insulating coating is removed;
a plurality of coil groups are each configured by connecting said tip portion of said first conductor terminal and said tip portion of said second conductor terminal that is subject to connection therewith using a connecting conductor; and
said connecting conductors comprise:
a pair of connecting portions that are respectively disposed so as to contact a surface of each of said tip portion of said first conductor terminal and said tip portion of said second conductor terminal facing a circumferential direction that is subject to connection therewith in a circumferential direction of said tip portions so as to be parallel to said tip portions, and that are joined together with said tip portions; and
a linking portion that links said pair of connecting portions.

2. The rotary electric machine stator according to claim 1, wherein said pairs of connecting portions are respectively joined by TIG welding to said tip portions of said first conductor terminals and said tip portions of said second conductor terminals that are subject to connection therewith.

3. The rotary electric machine stator according to claim 1, wherein said pairs of connecting portions respectively have identical radial thicknesses to said tip portions of said first conductor terminals and said tip portions of said second conductor terminals that are subject to connection therewith, and are disposed at radial positions that are identical to those of said tip portions.

4. The rotary electric machine stator according to claim 1, wherein said first conductor terminals extend outward at said first axial end of said stator core from a radially innermost position inside said slots, and are arranged circumferentially, and said second conductor terminals extend outward at said first axial end of said stator core from a radially outermost position inside said slots, and are arranged circumferentially.

5. The rotary electric machine stator according to claim 4, wherein:
said stator winding comprises coil ends between a first conductor terminal row in which said first conductor terminals are arranged circumferentially and a second conductor terminal row in which said second conductor terminals are arranged circumferentially; and
said connecting conductors are disposed so as to cross over in a radial direction axially outside said coil ends, and recess portions are formed on portions of said linking portions that face said coil ends such that gaps are ensured between said linking portions and said coil ends.

6. The rotary electric machine stator according to claim 4, wherein tip portions of said first conductor terminals and tip portions of said second conductor terminals that are subject to connection therewith are aligned in a radial direction.

7. The rotary electric machine stator according to claim 1, wherein said connecting conductors are produced using a plate or a wire material that has a rectangular cross section.

8. The rotary electric machine stator according to claim 1, wherein said connecting conductors are produced using a wire material that has a circular cross section.

* * * * *